(12) United States Patent
Grunze et al.

(10) Patent No.: US 6,764,758 B1
(45) Date of Patent: Jul. 20, 2004

(54) SURFACE-MODIFIED LAYER SYSTEM

(75) Inventors: Michael Grunze, Neckargemünd (DE); Wolfgang Eck, Heidelberg (DE); Armin Gölzhäuser, Heidelberg (DE); Michel Zharnikov, Heidelberg (DE); Volker Stadler, Heidelberg (DE); Wolfgang Geyer, Neuwied (DE)

(73) Assignee: Universitat Heidelberg, Heidelberg (DE)

( * ) Notice: Subject to any disclaimer, the term of this patent is extended or adjusted under 35 U.S.C. 154(b) by 0 days.

(21) Appl. No.: 10/088,953

(22) PCT Filed: Sep. 20, 2000

(86) PCT No.: PCT/DE00/03264
§ 371 (c)(1),
(2), (4) Date: Aug. 13, 2002

(87) PCT Pub. No.: WO01/23962
PCT Pub. Date: Apr. 5, 2001

(30) Foreign Application Priority Data

Sep. 24, 1999 (DE) .......................... 199 45 935

(51) Int. Cl.[7] .............................. B32B 15/04; C08J 7/06
(52) U.S. Cl. ........................ 428/336; 428/420; 428/457; 427/496; 427/498; 427/504; 427/506; 427/508; 427/512; 427/520
(58) Field of Search ................................ 428/457, 336, 428/420; 427/496, 498, 504, 506, 508, 512, 520

(56) References Cited

U.S. PATENT DOCUMENTS 5,338,571 A   8/1994   Mirkin et al. ............... 427/299
5,728,431 A   3/1998   Bergbreiter et al. ...... 427/388.1

FOREIGN PATENT DOCUMENTS

| DE | 198 15 220 A1 | 9/1999 |
| EP | 0 385 656 A2 | 9/1990 |
| EP | 0 511 590 A1 | 11/1992 |
| EP | 0 561 279 A1 | 9/1993 |
| EP | 0 593 875 A2 | 4/1994 |

OTHER PUBLICATIONS

*C. G. Wu, et al., "Chemical Deposition of Ordered Conducting Polypyrrole Films on Modified Inorganic Substrates", Journal of Materials Chemistry, GB, The Royal Society of Chemistry, Cambridge, vol. 7, No. 8, Aug. 1, 1997, pp. 1409–1413.

*Primary Examiner*—Monique R. Jackson
(74) *Attorney, Agent, or Firm*—Weingarten, Schurgin, Gagnebin & Lebovici LLP

(57) ABSTRACT

The invention relates to a surface-modified layer systems, a method for the production and use thereof. The invention in particular relates to surface-modified layer systems, comprising a substrate and a mono-layer at least partially arranged on said substrate. Said mono-layer is cross-linked in the lateral direction and covalently bonded by anchor groups to at least one surface of said substrate. Said mono-layer is also composed of low molecular weight aromatic and/or heteroaromatic compounds. The mono-layer which is cross-linked in the lateral direction is composed of low molecular weight aromatic and/or heteroaromatic compounds and is integral with the surface-modified layer system, and exhibiting the characteristics of a cross-linked solid. Said mono-layer protects the surfaces of the corresponding substrate from damage caused by friction and corrosion in a particularly advantageous manner.

15 Claims, No Drawings

SURFACE-MODIFIED LAYER SYSTEM

The present invention relates to surface-modified layer systems, a method for the production and use thereof. The present invention relates in particular to surface-modified layer systems that include a substrate and, at least partially disposed thereon, a laterally cross-linked monolayer, composed of low molecular weight aromatic and/or heteroaromatic compounds, that is covalently bonded via anchor groups to at least one surface of the substrate. The laterally cross-linked monolayer of the surface-modified layer systems according to the invention, that is composed of low molecular weight aromatic and/or heteroaromatic compounds, exhibits the characteristics of a cross-linked solid and consequently protects the surfaces of the corresponding substrates, particularly advantageously against damage from friction and corrosion.

According to the current state of the art, surfaces are usually protected against corrosive actions and mechanical stress, due to friction, by physisorbed thin fluid films (e.g., oils, waxes) or polymer coatings applied thereon. These conventional films usually have layer thicknesses in the range of a few micrometers up to millimeters. Their exact layer thickness, however, is difficult to control by process technology.

In the prior art, non-cross-linked monolayers, in particular those based on aliphatic hydrocarbon chains, have low mechanical stability and therefore provide insufficient protective action. Moreover, non-cross-linked monolayers desorb on contact with corrosive agents, since individual molecules at defect sites are displaced from the surface and detachment of the layer progresses from such sites.

Conventional methods for producing such non-cross-linked monolayers of organic molecules on various substrates are described in more detail in, for example, A. Ulman, *"An Introduction to Ultrathin Films,"* Academic Press, Boston 1991, and A. Ulman, Chem. Rev. 96, 1533 (1996).

The aim of the present invention is therefore to provide coating systems in which the coatings have high mechanical and chemical stability and the underlying substrate surfaces should be effectively protected against damage from friction or corrosive agents. The layer thickness for such protective layers should be precisely controllable and range from 0.3 nm to 3 nm. Such systems should be particularly suitable for surface protection of mechanically moving devices with small working clearances in the micrometer or nanometer range, such as hard disk drives for electronic data storage, or for surface protection of micromechanical devices with moving parts of dimensions in the micrometer range and smaller.

This aim is achieved by the embodiments specified in the claims. In particular, a surface-modified layer system is provided that includes a substrate and, at least partially disposed thereon, a laterally cross-linked monolayer, composed of low molecular weight aromatic and/or heteroaromatic compounds, that is covalently bonded via anchor groups to at least one surface of the substrate.

In contrast to coating systems available in the prior art, for example those based on physisorbed thin fluid films or polymer coatings, the protective layers according to the invention can be precisely controlled or, as the case may be, adjusted by virtue of the spatial extent of the molecules that make up the laterally cross-linked monolayer and are covalently bonded to the substrate surface via anchor groups.

The monolayer of the surface-modified layer system according to the invention preferably has a layer thickness in the range from 0.3 nm to 3 nm.

By means of covalent bonding to the substrate surface, the monolayer of the surface-modified layer system according to the invention effectively protects the underlying substrate surface against damage from friction or corrosive agents.

The laterally cross-linked monolayer of the surface-modified layer system according to the invention is preferably composed of aromatic compounds selected from the group consisting of phenyl, biphenyl, terphenyl, naphthalene, and anthracene, and/or composed of heteroaromatic compounds selected from the group consisting of bipyridine, terpyridine, thiophene, bithienyl, terthienyl, and pyrrole.

In one embodiment of the present invention, the monolayer, composed of low molecular weight aromatic compounds and/or heteroaromatic compounds, can have on its surface functional groups selected from halogen atoms, carboxy, trifluoromethyl, amino, nitro, cyano, thiol, hydroxy, or carbonyl groups. The low molecular weight aromatic and/or heteroaromatic molecules or units that comprise the monolayer are then, with the help of an anchor group, coupled chemically to the underlying substrate surface or covalently bonded to the latter.

Cross-linking of the monolayer in the lateral direction can in particular be achieved by treatment with electron beam radiation, plasma radiation, x-ray radiation, $\beta$-radiation, $\gamma$-radiation, or UV radiation.

The substrate, which is given high mechanical and chemical stability by the laterally cross-linked monolayer according to the invention and whose surface is therefore effectively protected against damage from friction or corrosive agents, is preferably selected from the group consisting of gold, silver, titanium, zirconium, vanadium, chromium, manganese, tungsten, molybdenum, platinum, aluminum, iron, steel, silicon, germanium, indium phosphide, gallium arsenide, and oxides or alloys or mixtures thereof as well as indium-tin oxide (ITO) and silicate or borate glasses.

If the surface of the substrate material is atomically flat and homogeneous, i.e., if for example it has no edge dislocations or defects, then the protective layer is also atomically flat, homogeneous, and defect-free, and forms a nearly perfectly smooth protective film on the substrate surface to be protected. The protective layer matches the morphology of the substrate almost perfectly. In this way, objects with three-dimensional surface morphologies can also be covered with a cross-linked protective layer of defined thickness.

The monolayers of the surface-modified layer system according to the invention can also exhibit electrical conductivity by means of passage of electrons or holes. This makes it possible to use the monolayers according to the invention in devices in which the passage of charge through the surface can be controlled by means of a stable protective layer, as for example in coated electronic components or electrodes.

The anchor group that chemically anchors the monolayers according to the invention to the substrate material is preferably selected from the group consisting of carboxy, thio, trichlorosilyl, trialkoxysilyl, phosphonate, hydroxamic acid, and phosphate groups, where the anchor groups, with the help of a spacer with length from 1 to 10 methylene groups, can be covalently bonded to the laterally cross-linked monolayer composed of low molecular weight aromatic and/or heteroaromatic compounds.

The nature of the anchor group is tailored to the particular substrate material, in a way known to one skilled in the art. For example, trichlorosilanes or trialkoxysilanes such as trimethyloxysilane, triethoxysilane, etc. are particularly suitable as anchor groups for oxidized silicon surfaces. Alcohol groups can be used for anchoring for hydrogenated silicon surfaces. For gold and silver surfaces, thio groups for example can be used as anchor groups; for oxidized metal surfaces such as iron or chromium, suitable anchor groups are phosphonic acids, carboxylic acids, or hydroxamic acids.

In a particularly preferred embodiment of the present invention, the surface-modified layer system includes a monolayer composed of biphenyl units that is covalently bonded to the corresponding substrate surface, such as for example gold or silver surfaces, via thio groups as anchor groups.

A further object of the present invention is to provide a method for production of surface-modified layer systems, according to the invention, that includes the steps:

(a) preparation of a substrate, (b) modification of the substrate surface, if necessary, (c) application of a monolayer of low molecular weight aromatic and/or heteroaromatic compounds with covalent bonding to a substrate surface via anchor groups, and (d) Treatment of the substrate obtained in step (c) with high-energy beam radiation so that the monolayer, composed of low molecular weight aromatic and/or heteroaromatic compounds and covalently bonded to the substrate surface via anchor groups, is covalently cross-linked in the lateral direction.

Surprisingly, it was found within the context of the present invention that the monolayers applied in step (c), when treated with high-energy radiation, preferably x-ray radiation, $\beta$-radiation, $\gamma$-radiation, or UV radiation, covalently cross-link in the lateral direction so that a chemically completely covalently bonded, thin, and tough protective layer is formed on the substrate surface. By cross-linking in the lateral direction, the monolayers, composed of low molecular weight aromatic and/or heteroaromatic compounds, acquire high mechanical and chemical stability, and effectively protect the underlying substrate surface against damage from friction or corrosive agents.

In one embodiment of the method according to the invention, in step (d) the cross-linking with lateral structuring can be carried out by means of finely focused ionizing electron, ion, or photon beam radiation. The focusing and scanning of the beam over the areas to be structured can be done by electron optics or ion optics elements, as for example in electron beam lithography with scanning electron microscopes, or focused ion beam (FIB) lithography. The structuring can also be carried out preferably by means of a local probe method. Focusing of the electrons, ions, or photons in the latter case is assured by the small size of the electron, ion, or photon source (local probe). The local probe is then moved over the region to be structured at intervals between 0.1 nm and 1000 nm. Particularly suitable local probes for electrons include tips of scanning tunneling microscopes (STM), atomic force microscopes (AFM), and atomically defined field-emitter tips, that for example have been made by the method of Muller et al. (Ultramicroscopy 50, 57 (1993)). The latter are particularly suitable as local probes for structuring with larger distances (>10 nm) between probe and sample, and can also be used as field ion sources. Fine tips made of glass or another photon-conducting material, as are used in near-field optical microscopes (SNOM), are suitable for structuring with photons. In any local probe method, the local probe is positioned directly over the area to be exposed by means of a positioning device, for example one made of piezoceramic elements.

If in step .(c) instead of applying a monolayer of low molecular weight aromatic and/or heteroaromatic compounds, for example, saturated molecules or units such as cyclohexyl, bicyclohexyl, tercyclohexyl, partially or completely hydrogenated naphthalene or anthracene, or partially or completely hydrogenated heteroaromatic compounds that are covalently bonded to the substrate surface by means of an anchor group, are applied, then in treatment with high-energy beam radiation in step (d), dehydrogenation to the corresponding aromatic or heteroaromatic compounds can occur in addition to cross-linking in the lateral direction. If nitro groups are bonded to the surface of the monolayer composed of low molecular weight aromatic and/or heteroaromatic compounds, then in step (d) of the method according to the invention, these nitro groups can also be converted to amino groups in the impact zone of the cross-linking beam radiation.

In a further embodiment of the method according to the invention, treatment with high-energy beam radiation using a shadow mask can be carried out so that only spatially defined areas of the monolayer applied to the substrate surface are exposed, as a result of which a structured surface is formed on the substrate with protected and unprotected areas, i.e., the exposed regions are protected. The surface-modified layer system according to the invention can therefore be used as a negative resist.

For irradiation with electrons, a large-area illuminating electron source can be used, for example, a "flood gun" or a setup as described in FIG. 2 of Hild et al., Langmuir, 14, 342–346 (1998). The electron energies used can then be adapted to the respective organic films and their substrates over a broad range, preferably from 1 to 1000 V. For example, 50 eV electron beam radiation can be used for cross-linking 4-biphenyl thiol on gold.

A large-area illuminating electron source combined with a shadow mask can be used for lateral structuring, so that only the open areas are exposed to the electrons. Also suitable for lateral structuring are focused electron beams, which can be positioned over the areas to be cross-linked by a scanning electron microscope. In addition, electron sources such as field emitter tips, from which the electrons are emitted in a small angular range, can be directly used if they are positioned over the areas to be cross-linked by means of suitable displacement devices (step motors, piezotranslators).

For large-area cross-linking by means of electromagnetic radiation (for example, x-rays, UV radiation), light sources available in the prior art can be used. For lateral structuring, masks appropriate for the respective wavelength range or scanning by means of a suitable light guide (optical fiber) are available.

The monolayers according to the invention, laterally cross-linked by irradiation, exhibit a clear reduction in loading on the substrate material resulting from mechanical or chemical stress. Standard corrosion tests according to DIN 50905 with electron-beam cross-linked biphenyl monolayers on steel (anchor group: phosphonic acid), gold and silver (anchor group: thiol) show a reduction in anodic current and pinhole formation of up to 99.5%. Friction tests according to DIN 50281 on coated silicon surfaces, with electron-beam cross-linked biphenyl monolayers and trichlorosilyl groups as the anchor group, show a reduction in wear by up to 95%.

The substrate surface can be cleaned or chemically modified before the monolayer is applied. Cleaning can be performed by simple rinsing of the surface with water or organic solvents such as ethanol, acetone, or dimethylformamide, or by treatment with an oxygen plasma generated by UV irradiation. If monolayers with anchor groups such as phosphonic acid, carboxylic acid, or hydroxamic acid groups are to be applied to oxidized metal surfaces, prior controlled oxidation of the metal surface is advantageous. This can be done by treating the metal surface with oxidizing agents such as hydrogen peroxide, Caro's acid, or nitric acid. A further option for modification of a substrate surface is to apply a first organic monolayer with terminal reactive groups such as amino, hydroxy, chloro, bromo, carboxy, or isocyanate groups, to which in a second step the monolayer actually to be cross-linked is chemically coupled by means of appropriate functional groups.

In step (c) of the method according to the invention, the application can be carried out, for example, by a dipping/spin casting method or by adsorption from dilute solution.

Mechanical wear of non-cross-linked monolayers of individual molecules proceeds faster and to a greater extent than for the cross-linked monolayers of the surface-modified layer systems according to the invention.

Furthermore, in the case of aliphatic hydrocarbon chains, treatment with high-energy beam radiation leads to degradation of the monolayers.

The aromatic monolayers according to the invention are especially suitable for surface protection of substrates that are used as mechanically moving devices with small working clearances in the micrometer and nanometer range. They are particularly suitable for use on substrates such as hard disks for magnetic data storage, on micromechanical devices, diskettes or compact disks. Furthermore, they can be used as molecular negative resists for production of integrated circuits and micromechanical components.

The present invention is explained in more detail by the following examples.

EXAMPLE 1

A monolayer of 4-biphenyl thiol on gold is produced by immersing a silicon wafer with a 100 nm thick vapor-deposited gold layer for one hour in a 1 millimolar ethanol solution of 4-biphenyl thiol. Then the wafer is removed, rinsed several times with ethanol p.a. and dried in a stream of nitrogen. To cross-link the layers, the wafer with the monolayer is irradiated in a vacuum chamber ($p=10^{-5}$ to $10^{-9}$ mbar) with a "Leybold flood gun" (Model 869000) with electrons of energy 100 eV and a dose of 40,000 $\mu C/cm^2$. After removal from the vacuum chamber, the layer can be immediately used for its intended application, or chemically functionalized further.

EXAMPLE 2

After a stainless steel surface has been cleaned several times with conventional organic detergent solutions and rinsed several times with deionized water, a monolayer of 4-terphenylphosphonic acid is produced by treating the cleaned surface with a 1 millimolar solution of terphenylphosphonic acid in dimethylformamide. After 12 hours, the monolayer is formed and the steel substrate is rinsed once each with pure dimethylformamide and with deionized water. Then the monolayer is irradiated and cross-linked as in Example 1. The electron energy can be raised in this case up to 200 eV. A dose of 30,000 $\mu C/cm^2$ is enough for complete cross-linking.

EXAMPLE 3

A silicon gear with a diameter of 500 $\mu$m is placed for 1 min in a mixture of 3 parts 30% hydrogen peroxide and 1 part conc. sulfuric acid. Then it is rinsed with deionized water and placed in a 1 millimolar solution of 4-trichlorosilylbiphenyl in tetrahydrofuran. After two hours, the gear is removed, rinsed with tetrahydrofuran, dried in a stream of nitrogen, and subjected to the same irradiation and cross-linking procedure as in Example 1. A stable and continuous cross-linked surface layer is obtained that effectively protects the gear against mechanical wear.

EXAMPLE 4

Monolayers of 4,4'-nitrobiphenyl thiol are produced on a gold surface as in Example 1. Before irradiation, the layer is covered with a metallic shadow mask. After irradiation, carried out as in Example 1, the nitro groups on the exposed spots have been converted to amino groups and the layer is cross-linked at those spots. The remaining areas of the layer, covered by the mask, remain unaltered.

The amino groups formed by the irradiation can, for example, be acylated by subsequent treatment with an isocyanate, acid chloride, or acid anhydride from solution in an organic solvent such as tetrahydrofuran or acetone.

What is claimed is:

1. A surface-modified layer system comprising a substrate and, at least partially disposed thereon, a laterally cross-linked monolayer, wherein said monolayer is composed of low molecular weight aromatic and/or heteroaromatic compounds covalently bonded via anchor groups to at least one surface of the substrate, wherein said monolayer is cross-linked by treatment with electron beam radiation, plasma radiation, x-ray radiation, β-radiation, γ-radiation or UV radiation.

2. The surface-modified layer system according to claim 1, wherein said monolayer comprises an aromatic compound selected from the group consisting of phenyl, biphenyl, terphenyl, naphthalene and anthracene, or an heteroaromatic compound selected from the group consisting of bipyridine, terpyridine, thiophene, bithienyl, terthienyl and pyrrole.

3. The surface-modified layer system according to claim 1, wherein the anchor groups are selected from the group consisting of carboxy, thio, trichlorosilyl, trialkoxysilyl, phosphonate, hydroxamic acid and phosphate groups.

4. The surface-modified layer system according to claim 3, wherein the anchor groups, with the help of a spacer with length from 1 to 10 methylene groups, are covalently bonded to the laterally cross-linked monolayer.

5. The surface-modified layer system according to claim 1, wherein the substrate is selected from the group consisting of gold, silver, titanium, zirconium, vanadium, chromium, manganese, tungsten, molybdenum, platinum, aluminum, iron, steel, silicon, germanium, indium phosphide, gallium arsenide, oxides or alloys or mixtures thereof, indium-tin oxide, and silicate or borate glasses.

6. The surface-modified layer system according to claim 1, wherein said monolayer has on its surface functional groups selected from the group consisting of halogen atoms, carboxy, trifluoromethyl, amino, nitro, cyano, thiol, hydroxy and carbonyl groups.

7. The surface-modified layer system according to claim 1, wherein the monolayer is composed of biphenyl units and the anchor groups are thio groups.

8. The surface-modified layer system according to claim 1, wherein the monolayer has a layer thickness in the range of 0.3 nm to 3 nm.

9. A method for producing the surface-modified layer system according to claim 1, said method comprising the steps of:
   (a) preparing a substrate;
   (b) applying a monolayer of low molecular weight aromatic and/or heteroaromatic compounds to a substrate surface via covalent bonding anchor groups; and
   (c) treating said covered substrate from step (b) with high-energy beam radiation, wherein said monolayer is covalently cross-linked in the lateral direction.

10. The method according to claim 9, said method further comprising, prior to said applying step, the step of modifying a surface of said substrate.

11. The method according to claim 9, wherein, in step (c), the high-energy beam radiation is electron beam radiation, plasma radiation, x-ray radiation, β-radiation, γ-radiation or UV radiation.

12. The method according to claim 9, wherein, in step (c) said cross-linking is carried out by means of finely focused ionizing electron beam, ion beam or photon beam radiation.

13. The method according to claim 12, wherein, in step (c) said cross-linking is carried out by means of a local probe.

14. The method according to claim 9, wherein, in step (c), treatment with high-energy beam radiation is carried out using a shadow mask so that only spatially defined areas of the monolayer are exposed.

15. The method according to claim 9, wherein, in step (b), application of the monolayer is carried out by a dipping/spin casting method or by adsorption from dilute solution.

* * * * *

UNITED STATES PATENT AND TRADEMARK OFFICE
CERTIFICATE OF CORRECTION

PATENT NO. : 6,764,758 B1
DATED : July 20, 2004
INVENTOR(S) : Michael Grunze et al.

It is certified that error appears in the above-identified patent and that said Letters Patent is hereby corrected as shown below:

Title page,
Delete "15 Claims, No Drawings" and insert -- 15 Claims, One Sheet of Drawing --.

Drawings,
Please insert the following Fig. 1:

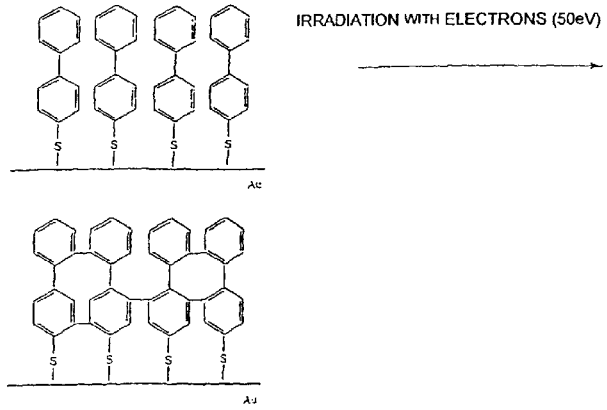

Column 5,
After line 30, insert the following paragraph:
-- Figure 1 schematically depicts a surface-modified layer system according to the invention, produced by irradiation of a monolayer composed of 4-biphenyl thiol molecules on a gold surface, with electron beam radiation (50 eV). --.

Signed and Sealed this

Seventh Day of February, 2006

JON W. DUDAS
*Director of the United States Patent and Trademark Office*